UNITED STATES PATENT OFFICE.

EDWARD S. CHAPIN, OF NEW YORK, N. Y.

SULFUR DYE AND PROCESS OF MAKING SAME.

No. 909,154.  Specification of Letters Patent.  Patented Jan. 12, 1909.

Application filed February 24, 1906. Serial No. 302,745.

*To all whom it may concern:*

Be it known that I, EDWARD S. CHAPIN, a citizen of the United States, residing in the borough of Brooklyn, city and State of New York, have invented certain new and useful Improvements in Sulfur Colors and Process of Making the Same, of which the following is a specification.

My invention consists in heating salicylic acid (or its sodium salt) with sulfuring substances until a beautiful golden brown bronze dyestuff is produced.

The following example may serve to show the manner in which this coloring matter may be produced. Into a suitable crucible weigh 60 grams of sodium sulfid crystals and 15 grams of sulfur. Boil to dissolve the sulfur. Add 200 c. c. of water and 12 grams of salicylic acid. Evaporate the water and raise the temperature gradually to 300° C. Heat at 300° until the full strength of the coloring matter is produced. This will take about three hours.

The coloring matter produced is readily soluble in cold water, in cold alcohol, in alkaline and sodium sulfid solution to a golden brown bronze solution, and dyes cotton directly in a salt bath fast golden brown bronze shades.

The coloring matter produced may be concentrated in the usual manner by acids; in which case the purer more concentrated dyestuff obtained is insoluble in water or cold alcohol, soluble in sodium sulfid solutions to a rich golden brown bronze solution, and dyes cotton in a salt bath with the assistance of sal soda and sodium sulfid rich and fast golden brown bronze shades.

The dye is of a very good fastness to light, and fulling. By after-treatment with ordinary metallic salts these fastnesses are increased although the shade is changed somewhat. By after-treatment with bluestone the shade becomes an olive of remarkable fastness.

In place of salicylic acid I may use the sodium salt of salicylic acid which two substances are equivalents in the described reaction. When speaking in the claims of salicylic acid I intend to cover any equivalents of that substance, including its sodium salt.

I claim:

1. The process of making a coloring matter consisting in heating salicylic acid, with sodium sulfid and sulfur, substantially as described.

2. The coloring matter produced by heating salicylic acid, with sodium sulfid and sulfur, substantially as described, which is readily soluble in cold water, in cold alcohol, in alkaline and sodium sulfid solution to a golden brown bronze solution, and dyes cotton directly in a salt bath fast golden brown bronze shades, and forms when precipitated with an acid, a coloring matter which is insoluble in water or cold alcohol, soluble in sodium sulfid solution to a rich golden brown bronze solution, and dyes cotton in a salt bath with the assistance of sal soda and sodium sulfid, fast golden brown bronze shades.

In testimony whereof, I have hereunto signed my name in the presence of two subscribing witnesses.

EDWARD S. CHAPIN.

Witnesses:
FRITZ V. BRIESEN,
JOHN A. KEHLENBECK.